Figure 1:
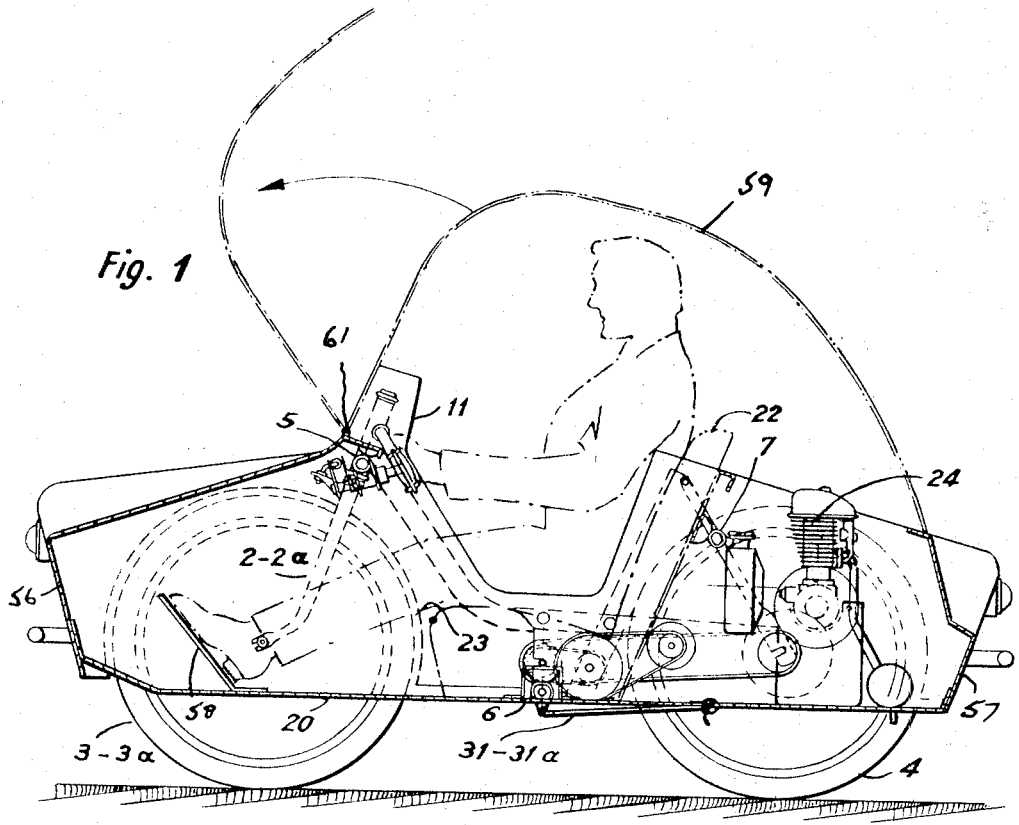

May 30, 1967   J. MULLER   3,322,224
AUTOMOTIVE VEHICLE
Filed July 14, 1964   2 Sheets-Sheet 1

Jacques Muller
By
Dean, Fairbanks & Hirsch
ATTORNEYS

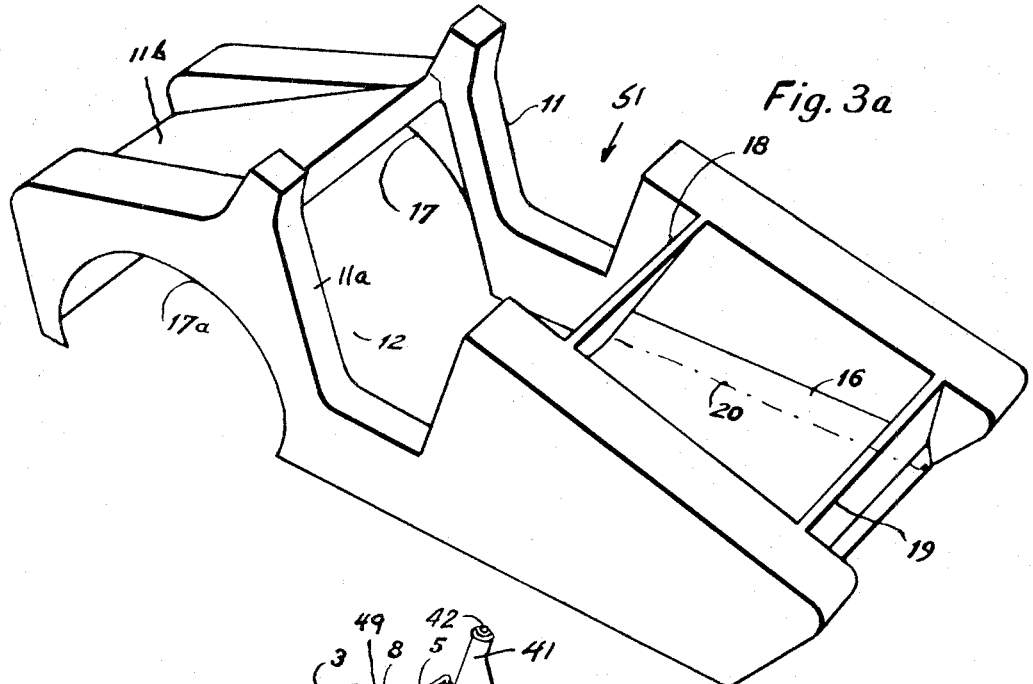
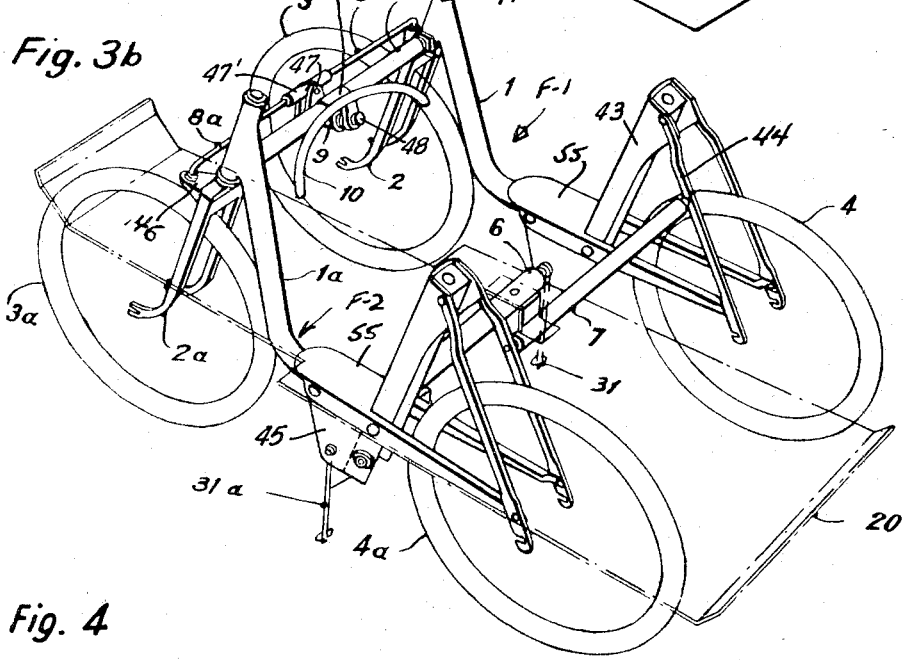

United States Patent Office 3,322,224
Patented May 30, 1967

3,322,224
AUTOMOTIVE VEHICLE
Jacques Muller, 123 Ave. du General de Gaulle,
La Garenne-Colombes, France
Filed July 14, 1964, Ser. No. 382,598
Claims priority, application France, July 30, 1963,
943,071
4 Claims. (Cl. 180—54)

As conducive to an understanding of the invention it is noted that due to the ever increasing number of automobiles in use, congestion occurs daily and especially at rush hours in the streets of cities and centers of population, even in smaller towns. Such congestion results in an ever increasing reduction in the speed at which drivers may proceed.

In addition to the problem of driving at an economical speed, the problem of parking vehicles is also becoming more and more difficult.

It has been found that although most vehicles are designed to cary four or more persons, in normal use, especially during business hours, the vehicle usually carries one person.

As a result of the excessive size of the vehicle, fewer vehicles can be accommodated in a given street which causes congestion during driving and minimizes the number of vehicles that can be parked in a given area.

Attempts have been made to solve this problem by manufacturing smaller vehicles which accommodate say two persons. However, where such vehicles are merely smaller versions of the larger size automobile, the necessity for expensive tooling and the use of a conventional engine results in an overall cost which, though less than that of the conventional size automobile, is not so much lower that it would encourage a purchaser to buy the smaller vehicle rather than the larger one.

It is accordingly among the objects of the invention to provide an automotive vehicle which utilizes a chassis that may readily be fabricated from relatively low cost standard components which, being readily available, would not require special tooling in the manufacture of the vehicle according to the present invention, which vehicle has the standard four wheel carriage of a conventional vehicle and will absorb the usual shock or impact normally encountered by a vehicle in use without the need for conventional relatively expensive shock absorbers, which vehicle is light in weight and hence may be driven by a relatively small power plant at speeds sufficiently high for normal use with a minimum of fuel consumption.

According to the invention, the vehicle comprises a chassis formed from two identical conventional bicycle frames joined together by transverse supports which retain the frames in spaced parallel relation, but permit slight independent movement of each of the four wheels to take up shock or impact. The front wheels of the vehicle are connected by a suitable coupling for movement by a single steering wheel or lever and the chassis supports a seat and the power plant to drive the vehicle.

Figure 2:
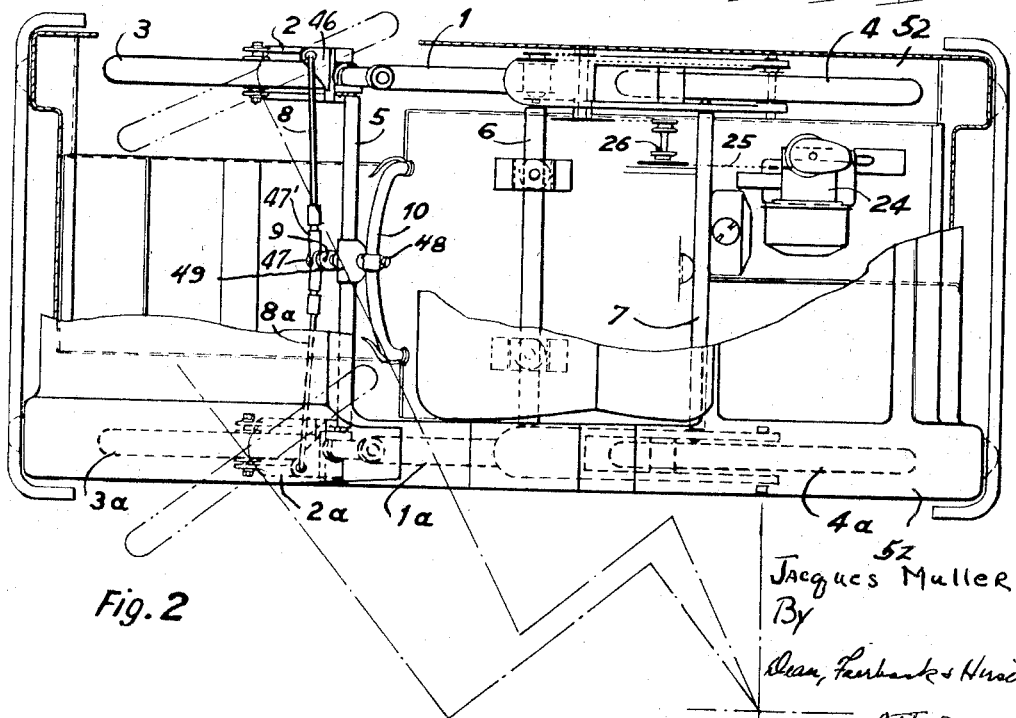

In the accompanying drawings in which is shown one of various possible embodiments of the several features of the invention, FIG. 1 is a side elevational view of the vehicle partly in broken lines, FIG. 2 is a top plan view of the vehicle partly in cross section with parts broken away, FIG. 3a is a perspective view of the body of the vehicle, FIG. 3b is a perspective view of the chassis of the vehicle, and FIG. 4 is a fragmentary longitudinal sectional view of the resilient mount of the chassis.

Referring now to the drawings, the vehicle has a chassis comprising two identical bicycle frames F–1, F–2 of conventional construction, the front tubular sleeves 41 of each of which rotatably mounts a shaft 42. The lower end of each shaft is secured to the crosspiece of an associated yoke 2, 2a each of which carries a front wheel 3, 3a.

The conventional seat supporting portion 43 of each frame which is rigidly connected to an associated sleeve 41 by longitudinal bar 1, 1a has the usual braces 44 for the rear wheels 4, 4a.

Means are provided to connect the frames F–1 and F–2 together in manner to insure that the frames will remain in spaced parallel relation, yet permit slight independent vertical movement of each of the wheels 3, 3a, 4 and 4a to take up shocks due to passage of the wheels over a rock or rut.

To this end, as shown in FIGS. 2, 3 and 4, a plurality of cross members 5, 6 and 7 are provided, each comprising a rigid tube of steel, for example, which has a sleeve 29 of resilient material in each end theerof, preferably of rubber. Extending through each sleeve 29 is a rod 30, the inner end of which is headed as at 29' and encompassed by a washer 30' which it retains against the inner end of the resilient sleeve 29. The outer end of each rod 30 is threaded as at 30a and encompassed by a nut 30b.

The cross members 5, 6, 7 extend transversely between the frames 1, 1a, the threaded rods 30 being secured to the sleeves 41; to the braces 44 and to the plates 45 secured to longitudinal bars 1, 1a and depending therefrom.

Thus, when the nuts 30b are tightened, the resilient sleeves 29 will be compressed between the nuts 30b and the associated washer 30' causing transverse expansion of each sleeve so that it securely yet resiliently grips the inner surface of each tube at each end thereof.

Consequently, the frames F–1, F–2 will be retained in spaced parallel relation yet each wheel will be resiliently supported so that transmission of shock or impact imparted to one of the wheels will be minimized with respect to the other wheels.

As shown in FIGS. 2 and 3b, the crosspiece of each of the yokes 2, 2a has a plate 46 secured thereto and extending laterally therefrom. Pivotally secured to each plate 46 is one end of a connecting rod 8, 8a, the free ends of which are pivotally connected as at 47 through articulated coupling sleeves 47'.

An actuating arm 9 is pivotally connected at one end to said pivot 47 as shown in FIG. 2 and depends therefrom. A steering shaft 48 is rigidly secured at one end to the other end of said arm 9 and is rotatably mounted in a suitable baring 49 affixed to cross member 5, a steering bar 10 being secured to the free end of shaft 48.

Thus, upon movement of the steering bar 10, the wheels will be simultaneously pivoted to steer the vehicle.

The chassis above described and shown in FIG. 3b, suports a body portion 51 shown in FIG. 3a. More particularly, the body portion which may be molded from suitable plastic comprises side members 11, 11a retained in spaced parallel relation by an inclined top wall 11b at the front thereof and a rear horizontal platform 16. In addition, the body includes transverse upright walls 18, 19 at each end of the platform 16 which in addition to imparting rigidity also provides a trunk.

As is clearly shown in FIG. 3a, each of the side members has an arcuate cutout 17, 17a at the front portion thereof to permit pivotal movement of the front wheels 3, 3a, the rear wheels being positioned in the cavities 52 defined by the rear portion of the side members 11, 11a.

Th body portion is positioned over the chassis so that it may be supported in any suitable manner by the sleeves 41 and the upper ends of the seat supporting portion 43. When so positioned, an opening 12 will be provided between the top wall 11b and the wall 18 and a seat 23 is positioned in such opening supported by lateral plates 55 secured to longitudinal bars 1, 1a as shown in FIG. 3, the seat depending from such plates 55. As is also shown, wall 18 supports the back rest 22 of the seat 23.

Extending beneath the body is a bottom wall 20 which is secured at its ends to the front wall 56 and to the rear wall 57 of the body respectievly, the bottom wall having a footrest 58 secured thereto.

If desired, a transparent hood 59 may be pivoted to the top wall as at 61 to enclose the driver.

The motor 24 which is mounted on the platform 16 may be of any conventional type and through a suitable transmission 25 including shiftable gear 26 will drive one of the rear wheels of the vehicle. A conventional accelerator pedal and brake handle are located within reach of the driver.

As the drive and brake for the vehicle may be of any conventional type they will not be described.

As the vehicle above described is relatively light in weight, in the event it is necessary to change one of the tires, one side of the vehicle may be lifted and supported from the ground by pivoting the support bars 31, 31a to vertical position.

As the chassis of the vehicle above described may be made from conventional bicycle frames, and other elements which are of standard construction and readily available; no special tooling would be required for fabrication of the vehicle and as the chassis may be readily assembled, its cost is extremely low. The body also may readily be fabricated in a single piece by molding and also can be a low cost item, especially if molded in quantity.

Since the vehicle may be of cost much less than the conventional "compact" automobiles, it can function as a second car which will be of use to the housewife for shopping, and also of use to the business man to drive to a train or to drive to a parking area adjacent his office.

By reason of the small size of the vehicle, it may readily be parked in a small area and since a much larger number of vehicles of the above type may be accommodated on a given street, than could be accommodated if the vehicle were of standard or even "compact" size, congestion is minimized.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An automotive vehicle comprising a pair of bicycle frames, each of said frames having a substantially vertical sleeve at the front thereof, a shaft rotatably mounted in each of said sleeves, a yoke having a cross piece, each of said shafts being secured to an associated cross piece, each of said frames having a front and rear wheel, means rotatably mounting each of said wheels, said front wheels being rotatably mounted between the legs of an associated yoke, a plurality of cross braces extending transversely between said frames to retain the latter in spaced parallel relation, one of said cross braces being secured at opposed ends to said sleeves, means resiliently connecting each of said cross braces to the frames for independent vertical movement of each of said wheels, a rigid member secured to each of said yokes and extending forwardly therefrom, connector means extending between said rigid members and pivotally secured at each end thereto, a rigid actuating arm pivotally affixed at one end to said connector means between its ends and depending therefrom at right angles thereto, a steering shaft rigidly secured to the other end of said actuating arm, means carried by the cross braces secured to the sleeves rotatably to mount said shaft, whereby upon rotation of said shaft said front wheels will be pivoted to steer the vehicle and means to drive at least one of said wheels to effect movement of the vehicle.

2. The combination set forth in claim 1 in which said connector means comprises a pair of rigid rods, one end of each rod being pivoted to each of said rigid members, the other end of each of said rods being pivotally connected and the rigid actuating arm is secured to the pivot connection between the other ends of said rods.

3. The combination set forth in claim 1 in which a molded plastic body is supported on said frames, said body having an opening defined adjacent the steering shaft, and a platform defined at the rear portion thereof, the means to drive said vehicle comprising a motor mounted on said platform and operatively connected to at least one of said wheels.

4. An automotive vehicle comprising a pair of bicycle frames, each having a front and rear wheel, means rotatably mounting each of said wheels, means pivotally mounting each of said front wheels, a plurality of cross braces extending transversely between said frames to retain the latter in spaced parallel relation, each of said cross braces having an axial hollow portion at each end, a resilient sleeve positioned in each hollow portion, a rod extending through each sleeve and having a stop member at its inner end, the outer end of each of said rods being threaded, a nut screwed on each of the threaded ends of the rods, said rods being secured to the respective frames whereby when said nuts are tightened, the resilient sleeve will be compressed and transversely expanded securely to retain the rod in the hollow portion of each cross brace and resiliently mounting the rod therein, for independent vertical movement of each of said wheels, means to effect simultaneously pivotal movement of said front wheels to steer the vehicle and means to drive at least one of said rear wheels to effect movement of the vehicle.

References Cited

UNITED STATES PATENTS

| 469,722 | 3/1892 | Riess | 280—209 |
| 822,688 | 6/1906 | Nicholas | 280—209 |
| 1,102,079 | 6/1914 | Rizer | 287—124 X |
| 2,694,582 | 11/1954 | Reside | 280—209 |
| 2,814,524 | 11/1957 | Porsche et al. | 296—31 |

FOREIGN PATENTS

| 1,271,509 | 8/1961 | France. |
| 272,362 | 3/1914 | Germany. |
| 188,345 | 3/1924 | Great Britain. |

BENJAMIN HERSH, *Primary Examiner.*

MILTON L. SMITH, *Examiner.*